(12) United States Patent
Hasegawa et al.

(10) Patent No.: US 12,007,097 B2
(45) Date of Patent: Jun. 11, 2024

(54) LIGHTING DEVICE

(71) Applicant: Japan Display Inc., Tokyo (JP)

(72) Inventors: Makoto Hasegawa, Tokyo (JP); Nobuyuki Suzuki, Tokyo (JP); Takeo Koito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/378,807

(22) Filed: Oct. 11, 2023

(65) Prior Publication Data
US 2024/0117954 A1    Apr. 11, 2024

(30) Foreign Application Priority Data
Oct. 11, 2022  (JP) .................. 2022-162995

(51) Int. Cl.
| | |
|---|---|
| *G02F 1/29* | (2006.01) |
| *F21V 7/00* | (2006.01) |
| *F21V 7/06* | (2006.01) |
| *F21V 14/00* | (2018.01) |
| *G02F 1/1335* | (2006.01) |
| *G02F 1/1343* | (2006.01) |
| *G02F 1/1347* | (2006.01) |

(52) U.S. Cl.
CPC .......... *F21V 14/003* (2013.01); *F21V 7/0016* (2013.01); *F21V 7/06* (2013.01); *G02F 1/133528* (2013.01); *G02F 1/134309* (2013.01); *G02F 1/1347* (2013.01); *G02F 1/294* (2021.01)

(58) Field of Classification Search
CPC .... F21V 7/0016; F21V 7/0025; F21V 7/0033; F21V 7/0041; F21V 7/06; G02F 1/133528; G02F 1/1347
See application file for complete search history.

(56) References Cited

U.S. PATENT DOCUMENTS

| | | | |
|---|---|---|---|
| 2005/0281048 A1* | 12/2005 | Coushaine | F21S 43/251 362/555 |
| 2007/0139333 A1* | 6/2007 | Sato | G02F 1/29 345/90 |
| 2010/0157252 A1* | 6/2010 | Itoh | G03B 21/2073 362/241 |

(Continued)

FOREIGN PATENT DOCUMENTS

| | | |
|---|---|---|
| JP | 2006-012588 A | 1/2006 |
| JP | 2009-302063 A | 12/2009 |

(Continued)

*Primary Examiner* — Eric T Eide
(74) *Attorney, Agent, or Firm* — K&L Gates LLP

(57) ABSTRACT

A lighting device, comprises: a first reflector that includes a first hole where a light source is disposed, a second hole that emits light, and a reflection curved surface that connects the first hole and the second hole to each other, and the first reflector emits light to a first direction; a liquid crystal lens disposed to cover the second hole of the first reflector; and a polygonal pyramid including a bottom surface and a plurality of inclined surfaces, and being disposed so that the plurality of inclined surfaces oppose the liquid crystal lens. The plurality of inclined surfaces are reflection surfaces, and on the reflection surfaces, a traveling path of the light traveling to the first direction changes to a second direction. The liquid crystal lens can configure lenses corresponding to the plurality of inclined surfaces.

8 Claims, 17 Drawing Sheets

(56) References Cited

U.S. PATENT DOCUMENTS

| | | | | |
|---|---|---|---|---|
| 2013/0044492 A1* | 2/2013 | Totani | ............... | F21V 29/75 |
| | | | | 362/294 |
| 2018/0135834 A1* | 5/2018 | Bruchhage | ............... | F21V 3/061 |
| 2021/0262621 A1* | 8/2021 | Eom | ............... | F21V 9/30 |
| 2022/0364689 A1* | 11/2022 | Kaihatu | ............... | F21L 4/085 |

FOREIGN PATENT DOCUMENTS

| | | |
|---|---|---|
| JP | 2015-167089 A | 9/2015 |
| WO | WO1999039135 A1 | 8/1999 |

* cited by examiner

LIGHTING DEVICE

CLAIM OF PRIORITY

The present application claims priority from Japanese patent application JP2022-162995 filed on Oct. 11, 2022, the content of which is hereby incorporated by reference into this application.

BACKGROUND

The present invention relates to a lighting device capable of irradiating a light spot of an optional shape to plural orientation angle directions.

In a room, there is a demand of emitting light not in the vertical direction namely to the floor direction but in the horizontal direction namely to the wall direction and effecting indirect lighting with respect to a lighting device attached to the ceiling for example. On the other hand, in a park and the like, there exists a demand of using a lighting device as lighting in a park by irradiating light to the lateral side direction of the lighting device.

In Japanese Unexamined Patent Application Publication No. 2006-12588, there is described a configuration capable of irradiating light evenly to all of the periphery of a lighting device using one light source. Also, in Japanese Unexamined Patent Application Publication No. 2015-167089, there is described a configuration capable of irradiating light evenly to the periphery of a lighting device using plural light sources.

In Japanese Unexamined Patent Application Publication No. 2009-302063, there is described a configuration of changing the direction of a formed light beam using a reflector of a circular cone shape.

SUMMARY

According to the technologies of prior arts, although it is possible to irradiate light evenly to lateral sides of a lighting device, it is not possible to cope with a configuration of irradiating a light spot of an optional shape in plural direction of the lateral side.

An object of the present invention is to achieve a lighting device capable of forming a light spot of an optional shape to plural orientation angle directions by one light source. Also, an object of the present invention is to achieve such lighting device by a lighting device of a small size.

The present invention is to solve the problems described above, and main concrete means are as described below.

(1) A lighting device comprises: a first reflector that includes a first hole where a light source is disposed, a second hole that emits light, and a reflection curved surface that connects the first hole and the second hole to each other, in which a line connecting the center of the first hole and the center of the second hole is made to be a first direction, and the first reflector emits light to the first direction; a liquid crystal lens disposed to cover the second hole of the first reflector; and a polygonal pyramid including a bottom surface and three or more plurality of inclined surfaces, and being disposed so that the plurality of inclined surfaces oppose the liquid crystal lens. The plurality of inclined surfaces are reflection surfaces, and on the reflection surfaces, a traveling path of the light traveling to the first direction changes to a second direction, the second direction intersecting the first direction. The liquid crystal lens can configure lenses corresponding to the plurality of inclined surfaces.

(2) In the lighting device according to (1), the polygonal pyramid is a quadrangular pyramid.

DESCRIPTION OF THE PREFERRED EMBODIMENTS

Hereinafter, the present invention will be explained in detail using embodiments.

First Embodiment

Figure 1:
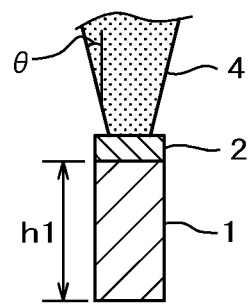
FIG. 1 is a side view of a lighting device emitting collimated light.

FIG. 1 is a side view of a lighting device 1 emitting collimated light to a predetermined direction. In FIG. 1, an optical component 2 such as a lens is disposed at the distal end of the lighting device 1 that is vertically long, and light is emitted from the optical component 2 such as a lens. The collimated light has a predetermined orientation angle θ.

The lighting device 1 for obtaining the collimated light often uses a parabolic curved mirror. In such the lighting device 1, in order to reduce the orientation angle θ of irradiated light 4, it is required to enlarge the length hl of the lighting device 1. Also, in order to obtain a predetermined light spot, it is required to dispose an optical component such as a corresponding lens.

Figure 2:
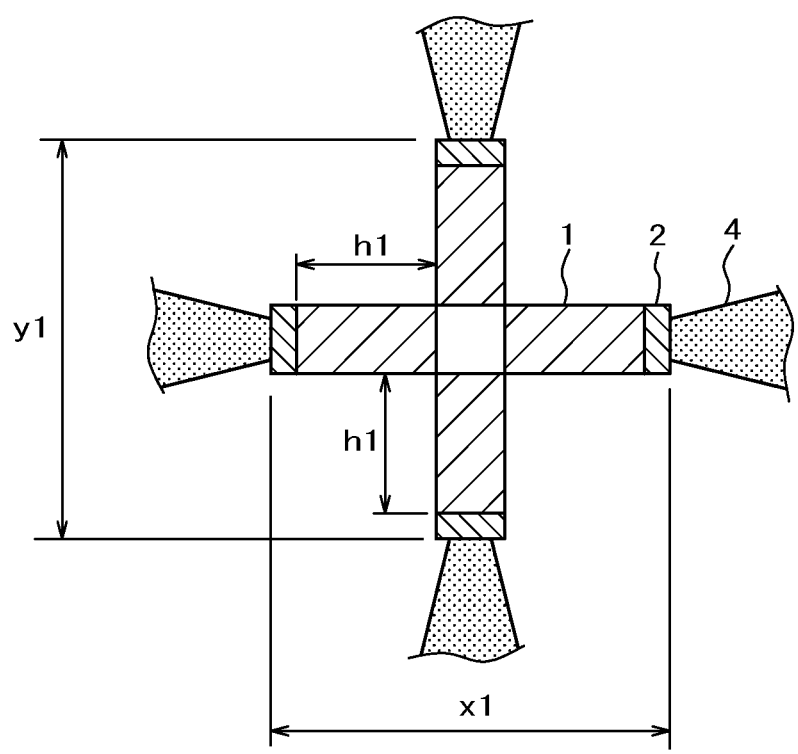
FIG. 2 is a plan view of a case of emitting light in four directions using the lighting device of FIG. 1

FIG. 2 is a plan view of a case of emitting the light having an optional spot shape to the lateral side direction of four directions. In FIG. 2, the lighting devices 1 illustrated in FIG. 1 are disposed in the horizontal direction at the orientation angle of 90 degrees. According to the lighting device set of FIG. 2, although an optional light spot can be formed in four directions, diameters x1, y1 in a plan view of the lighting device set become large as illustrated in FIG. 2. Also, as described in FIG. 1, when the collimated light is to be obtained, the length hl of the lighting device 1 becomes large. As a result, the diameters x1, y1 in the horizontal direction of the lighting device set become large further.

Figure 3:
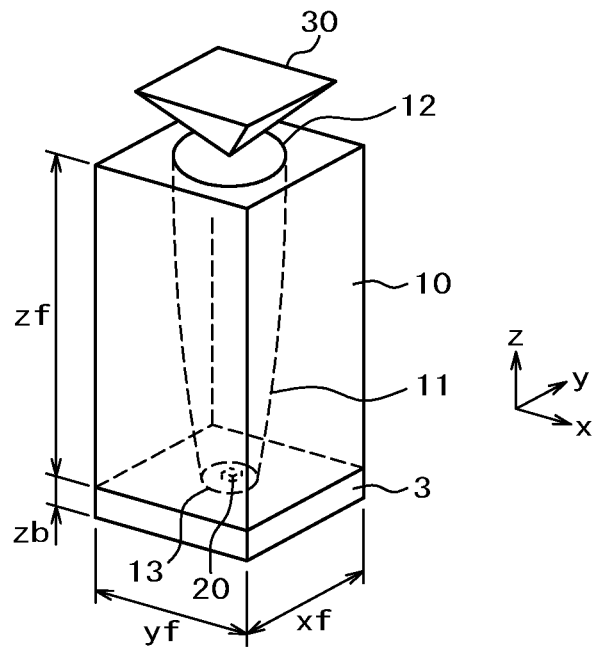
FIG. 3 is a perspective view illustrating a part of the lighting device of the present invention.

FIG. 3 is a perspective view illustrating a part of the lighting device according to the present invention solving such problems. In FIG. 3, a funnel type reflector 10 emitting the collimated light is disposed on a base 3. With respect to the funnel type reflector 10 as the first reflector, the outside is of a rectangular parallelepiped, and a reflection surface (which will be hereinafter referred to as a reflection curved surface) 11 whose wall surface is a parabolic curved surface is formed in the inside. An LED 20 as a light source is disposed in a hole (which will be hereinafter referred to as an LED hole) 13 formed in the bottom surface of the funnel type reflector 10. The light from the LED 20 is emitted from an emission hole 12 while being reflected by the reflection curved surface 11.

A quadrangular pyramid reflector 30 is disposed corresponding to the emission hole 12 with the reflection surface being positioned on the lower side, namely opposing the emission hole 12. Four reflection surfaces of the quadrangular pyramid reflector 30 are of a triangular shape whose apex angle is 90 degrees. The vertex of the quadrangular pyramid reflector 30 corresponds to the center axis namely the optical axis of the funnel type reflector 10. Therefore, the collimated light emitted from the emission hole 12 of the funnel type reflector 10 is reflected by four surfaces of the quadrangular pyramid reflector 30, and is emitted to four directions.

In FIG. 3, the outer shape of the funnel type reflector 10 is a rectangular parallelepiped, the height zf is approximately 20 mm, and each of widths xf, yf is approximately 10 mm for example. Also, since the base 3 only has to have the height of the degree of storing the LED substrate, it is sufficient that the height zb is approximately 3 mm for example. On the other hand, with respect to the quadrangular pyramid reflector, when one side is 10 mm, the height becomes approximately 3.5 mm. Therefore, the structure of FIG. 3 comes to have a very compact outer shape where the cross section is a square whose one side is 10 mm and the height is 30 mm or less. From such compact lighting device, the collimated light can be emitted to four directions.

Figure 4:
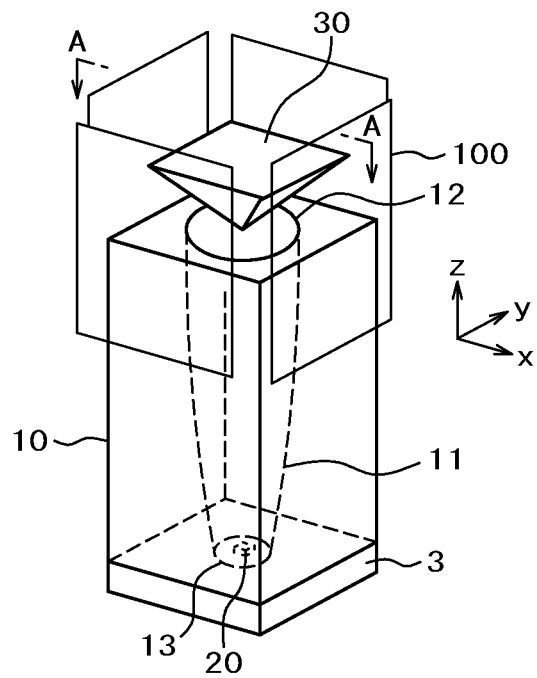
FIG. 4 is a perspective view illustrating a lighting device of a comparative example.
Figure 5:
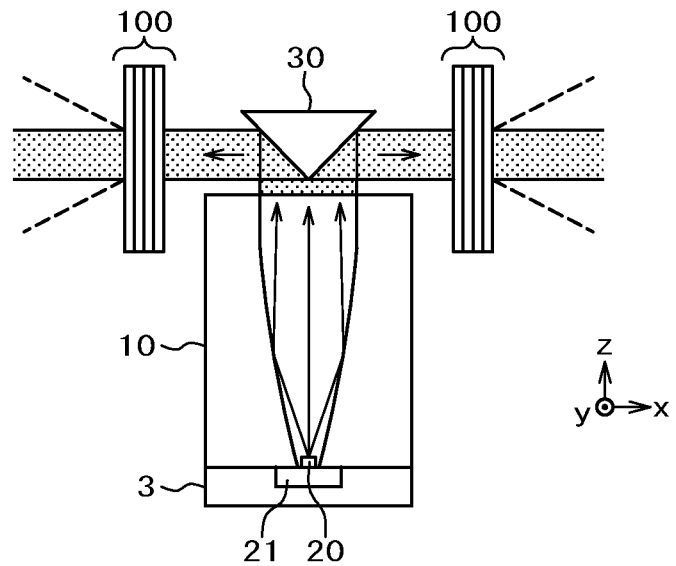
FIG. 5 is a cross-sectional view illustrating an action of the comparative example.

According to the structure of FIG. 3, although the predetermined collimated light can be emitted to predetermined four directions, the shape of the emitted light cannot be changed. The comparative example illustrated in FIG. 4 and FIG. 5 is configured such that liquid crystal lenses 100 are applied to the light reflected by the quadrangular pyramid reflector 30 in the configuration of FIG. 3. FIG. 4 is a perspective view illustrating this configuration.

In FIG. 4, there are disposed the liquid crystal lenses 100 having a main surface orthogonal to the light path of the light reflected by the quadrangular pyramid reflector 30. In FIG. 4, in order to illustrate the positional relation, it is described that the liquid crystal lens 100 is a transparent sheet. Although the liquid crystal lens 100 is configured to laminate thin liquid crystal lenses in actuality, in FIG. 4, in order to prevent complication of the drawing, the liquid crystal lens 100 is described to be as one sheet of the transparent sheet.

FIG. 5 is a cross-sectional view taken along the line A-A of FIG. 4. FIG. 5 is a cross-sectional view illustrating an action of FIG. 4. In FIG. 5, the reflection curved surface 11 is formed inside the funnel type reflector 10 whose outer shape is a rectangular parallelepiped. The LED 20 is disposed in the LED hole 13 formed in the bottom surface of the funnel type reflector 10. The LED 20 is disposed on an LED substrate 21, and the LED substrate 21 is stored within the base 3.

In FIG. 5, the light emitted from the LED 20 heads to the quadrangular pyramid reflector 30 from the emission hole 12 while being reflected by the reflection curved surface 11, and heads to the horizontal direction (x-direction) with the light path being bent by 90 degrees at the reflection surface of the quadrangular pyramid reflector 30. The light whose traveling path has been changed to the horizontal direction enters the liquid crystal lens 100, and is subjected to a lens action.

When the light is not subjected to the lens action in the liquid crystal lens 100, the light travels straight as it is to the horizontal direction. However, when the light is subjected to a diverging action by the liquid crystal lens 100, the light diverges as the dotted line of FIG. 5. As described below, since the liquid crystal lens 100 can effect the lens action of various shapes electrically, the light spot of various shapes can be obtained easily.

However, this configuration requires to dispose the liquid crystal lenses 100 at four positions. As illustrated in FIG. 5, the liquid crystal lens requires the four liquid crystal display panels. Therefore, the four liquid crystal lenses×4=16, that is, 16 liquid crystal lenses are required, and the manufacturing cost is boosted. In addition, precise positioning is also required for four sets of the liquid crystal lens 100, and this setting cost also comes to boost the manufacturing cost of the lighting device.

Figure 6:
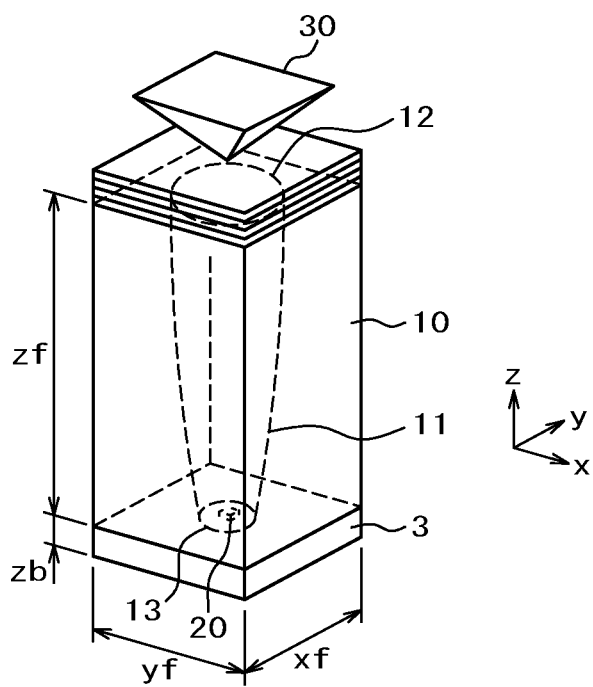
FIG. 6 is a perspective view of the lighting device of the present invention.

FIG. 6 is a perspective view of the lighting device by the present invention. FIG. 6 is the same as FIG. 3 to FIG. 5 which are comparative examples in terms that the light source is configured of the LED 20 and the collimated light is formed by the funnel type reflector 10. The feature of FIG. 6 is that the liquid crystal lens 100 for changing the shape of the light spot is disposed at the outlet of the light in the funnel type reflector 10. Therefore, only one set (four) of the liquid crystal lens 100 is required. Further, setting of the liquid crystal lens 100 is easy, and the manufacturing cost can be considerably reduced compared to the configuration of FIG. 3 to FIG. 5.

Figure 7:
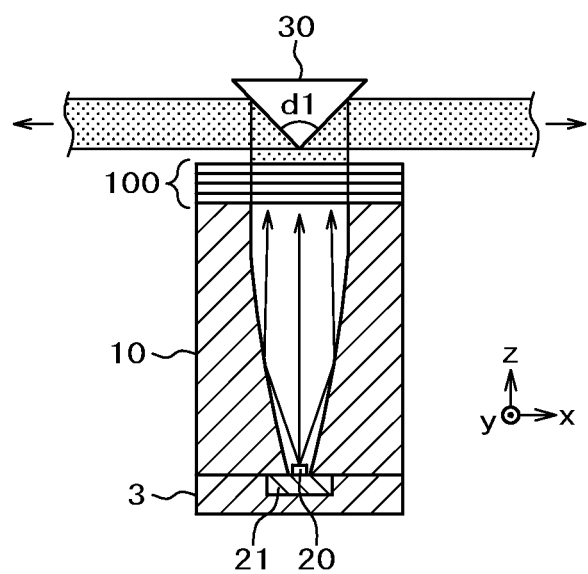
FIG. 7 is a cross-sectional view illustrating an action of the lighting device of the present invention.
Figure 8:
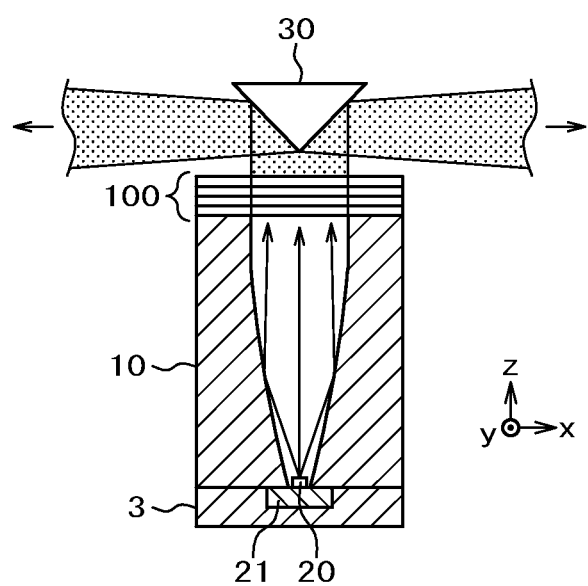
FIG. 8 is another cross-sectional view illustrating an action of the lighting device of the present invention.

In FIG. 6, over the liquid crystal lens 100, there is disposed the quadrangular pyramid reflector 30 including four reflection surfaces. In FIG. 6, the light flux is subjected to required control by the liquid crystal lens 100 before entering four reflection surfaces. FIG. 7 and FIG. 8 are cross-sectional views illustrating the operation of the configuration of FIG. 6.

FIG. 7 is a cross-sectional view of a case where the lens action by the liquid crystal lens 100 is not applied. In FIG. 7, the light emitted from the funnel type reflector 10 is not subjected to an action by the liquid crystal lens 100, and the traveling path of the light is bent by the quadrangular pyramid reflector 30. The direction along which the light is bent can be changed by the apex angle dl of the reflection surface of the quadrangular pyramid reflector 30. When dl is 90 degrees for example, the light is bent to the right angle direction.

FIG. 8 is a cross-sectional view of a case of forming a lens having a diverging action in the liquid crystal lens 100. In FIG. 8, the light emitted from the funnel type reflector 10 is subjected to the diverging action by the liquid crystal lens 100, and enters the reflection surface of the quadrangular pyramid reflector 30. Although the traveling path is bent by the quadrangular pyramid reflector 30, since this light has been subjected to the diverging action by the liquid crystal lens 100, the area of the cross section increases as the light travels.

Figure 9:
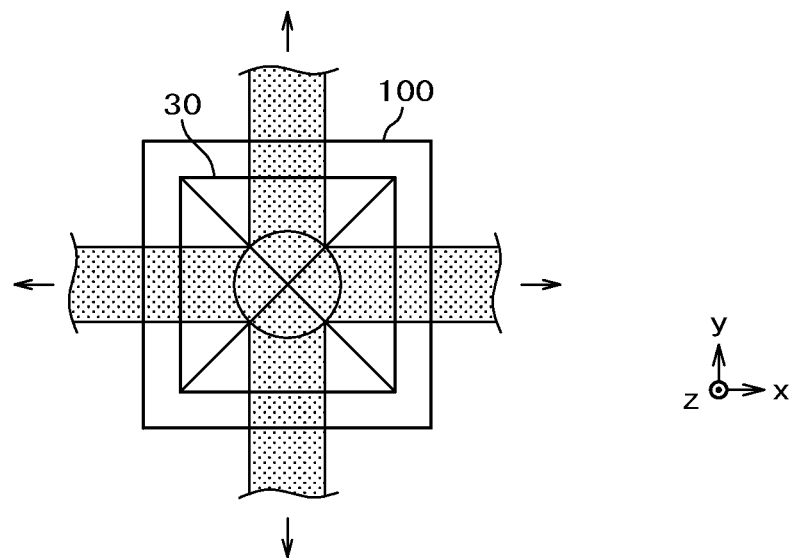
FIG. 9 is a cross-sectional view corresponding to FIG. 7.

FIG. 9 is a plan view of FIG. 7. In FIG. 9, although the plan views of the liquid crystal lens 100 and the quadrangular pyramid reflector 30 are of a rectangular shape, the outer shape of the liquid crystal lens 100 is larger. In FIG. 9, the circle at the center expresses a state that the light passes through the liquid crystal lens 100 and is projected on four reflection surfaces of the quadrangular pyramid reflector 30. This light is reflected by the reflection surfaces of the quadrangular pyramid reflector 30, and is emitted to x-direction and y-direction.

Figure 10:
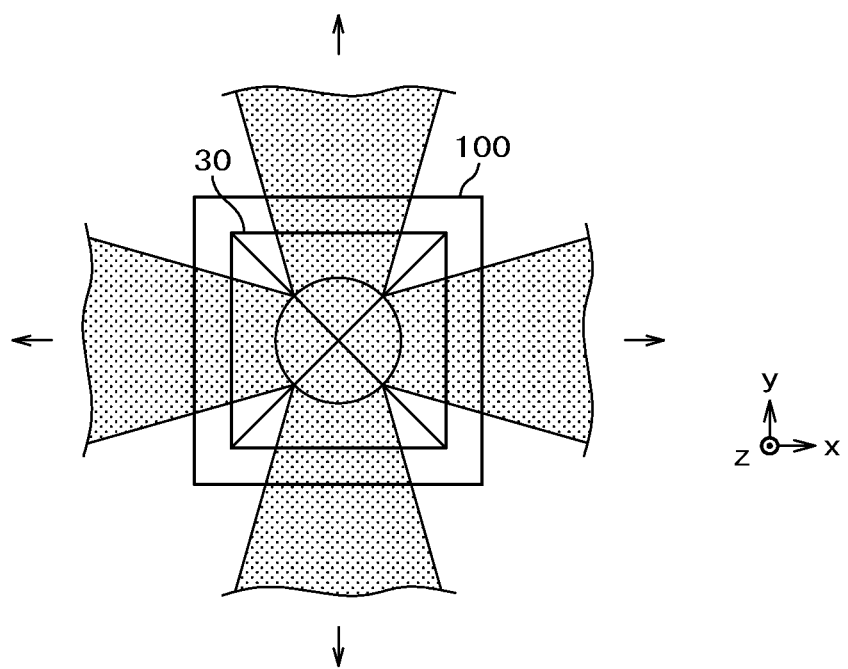
FIG. 10 is a cross-sectional view corresponding to FIG. 8.

FIG. 10 is a plan view of FIG. 8. In FIG. 10, although the plan views of the liquid crystal lens 100 and the quadrangular pyramid reflector 30 are of a rectangular shape, the outer shape of the liquid crystal lens 100 is larger. In FIG. 10, the circle at the center expresses a state that the light passes through the liquid crystal lens 100 and is projected on four reflection surfaces of the quadrangular pyramid reflector 30. This light is reflected by the reflection surfaces, and is emitted to x-direction and y-direction. However, in FIG. 10, the reflected light travels while being widened by the diverging action of the liquid crystal lens 100.

Therefore, the spot diameter of the lighting device illustrated in FIG. 8 and FIG. 10 is larger than the spot diameter of the lighting device illustrated in FIG. 7 and FIG. 9. The degree of enlargement can be controlled by the strength of the diverging lens formed in the liquid crystal lens 100. That is to say, the size of the light spot can be controlled easily by the liquid crystal lens 100.

Figure 11:
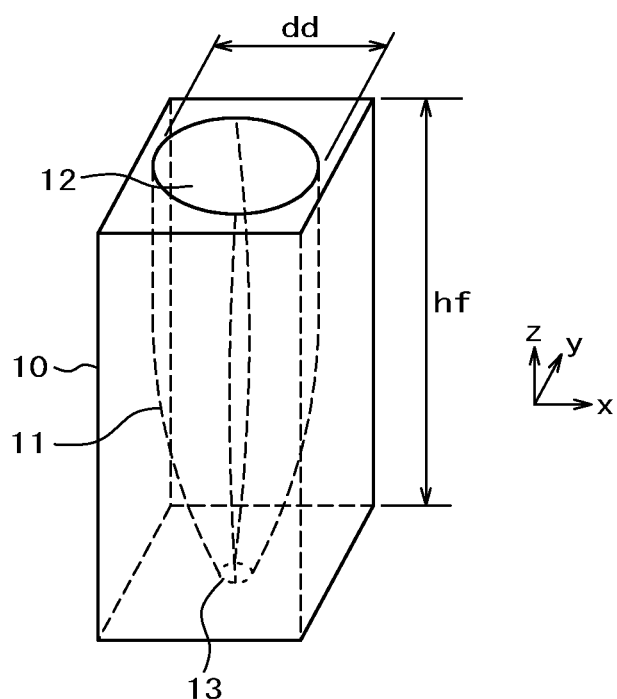
FIG. 11 is a perspective view of a funnel type reflector.

FIG. 11 is a perspective view of the funnel type reflector 10. The outer shape of the funnel type reflector 10 is a rectangular parallelepiped. In the inside of the rectangular parallelepiped, a recessed portion is formed into a funnel shape, and the wall surface of the recessed portion becomes the reflection curved surface 11. The shape of this recessed portion is a circle in x-y plane, and is a parabolic curved surface in the cross section of the Z-axis direction. By the parabolic curved surface, the light is collimated to a direction parallel to z-axis. Also, the wall surface of the recessed portion may be configured to be a partially parabolic curved surface.

In FIG. 11, in the lower surface of the rectangular parallelepiped, the LED hole 13 is formed. With respect to a small size LED, a small one of approximately 1.5 mm square in a plan view is also available in the market. In the LED hole 13, a space allowing such small LED to be incorporated only has to exist. In the upper surface of the rectangular parallelepiped, the emission hole 12 is formed. The emission hole 12 is of a circular shape with the diameter dd of approximately 6.5 mm for example.

The LED hole 13 and the emission hole 12 are connected to each other by the reflection curved surface 11. By the reflection curved surface 11, the light emitted from the LED 20 is collimated and is emitted from the emission hole 12. In FIG. 11, as the ratio (hf/dd) of the diameter dd of the emission hole 12 and the height of the funnel type reflector 10 is larger, more collimated light, namely, the emitted light with smaller orientation angle can be obtained. Here, "hf/dd" can be also referred to as an aspect ratio.

The aspect ratio is preferably 2 or more, more preferably 3 or more, and still more preferably 4 or more. According to the configuration of the present invention of FIG. 4, since the funnel type reflector 10 is used in the vertical orientation, the width in the horizontal direction of the lighting device is not affected even when the aspect ratio is made larger.

Figure 12:
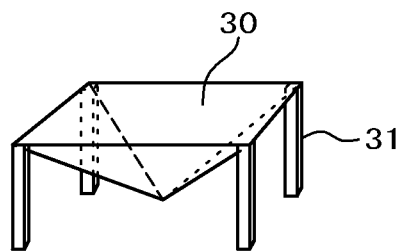
FIG. 12 is a perspective view of a quadrangular pyramid reflector.

FIG. 12 is a perspective view of the quadrangular pyramid reflector 30. In FIG. 6, FIG. 7, FIG. 8, and the like, although the quadrangular pyramid reflector 30 is illustrated so as to be suspended in midair in order to prevent complication of the drawing, in actuality, the quadrangular pyramid reflector 30 is supported by columnar supports 31 disposed at the corners of the quadrangular pyramid reflector 30. Each columnar support 31 comes to be disposed in the vicinity of the corner on the light exit surface side of the funnel type reflector 10. Since the light is not incident at the corners of the quadrangular pyramid reflector 30, there exists a space for disposing the columnar supports 31 as illustrated in FIG. 12.

Figure 13:
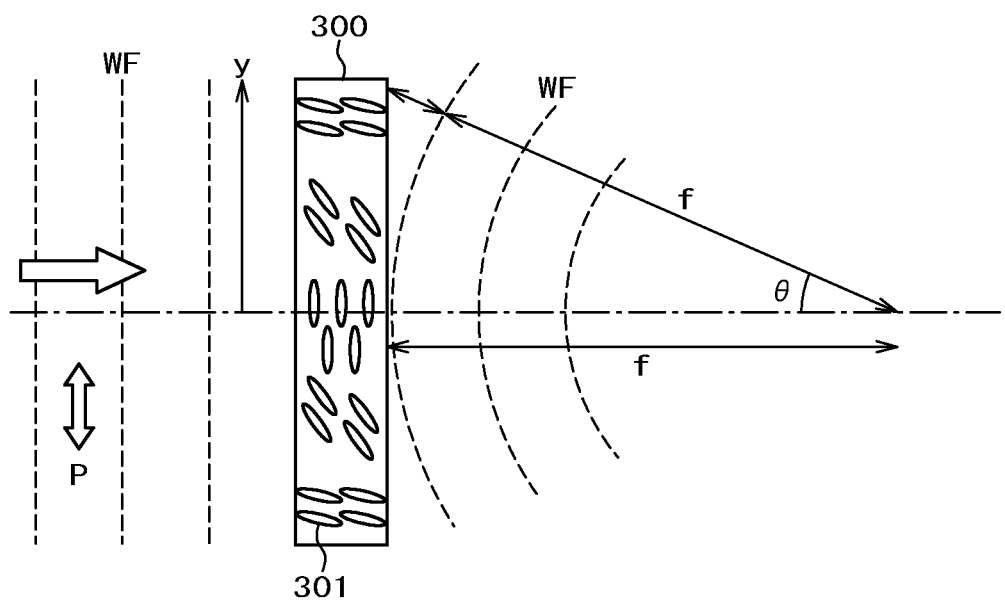
FIG. 13 is a cross-sectional view explaining a motion of a liquid crystal lens.

FIG. 13 is a cross-sectional view illustrating a principle of the liquid crystal lens 100. In FIG. 13, the collimated light is incident from the left side of a liquid crystal layer 300. P in FIG. 13 represents the deflection direction of the incident light. Although the deflection direction of normal light is distributed random, since the liquid crystal has anisotropy in the refraction index, FIG. 13 illustrates the action of the light deflected to P-direction.

In FIG. 13, in the liquid crystal layer 300, liquid crystal molecules 301 are oriented by the electrode so that the inclination becomes larger as they go to the periphery of the liquid crystal layer 300. Since the liquid crystal molecule 301 has an elongated shape and the effective refraction index in the long axis direction of the liquid crystal molecule 301 is larger than the effective refraction index in the short axis direction of the liquid crystal molecule 301, the refraction index becomes larger as it goes to the periphery of the liquid crystal layer 300, and therefore a convex lens is formed. The dotted line in FIG. 13 is the wave front WF of the light, and f is the focal length of the lens.

Figure 14:
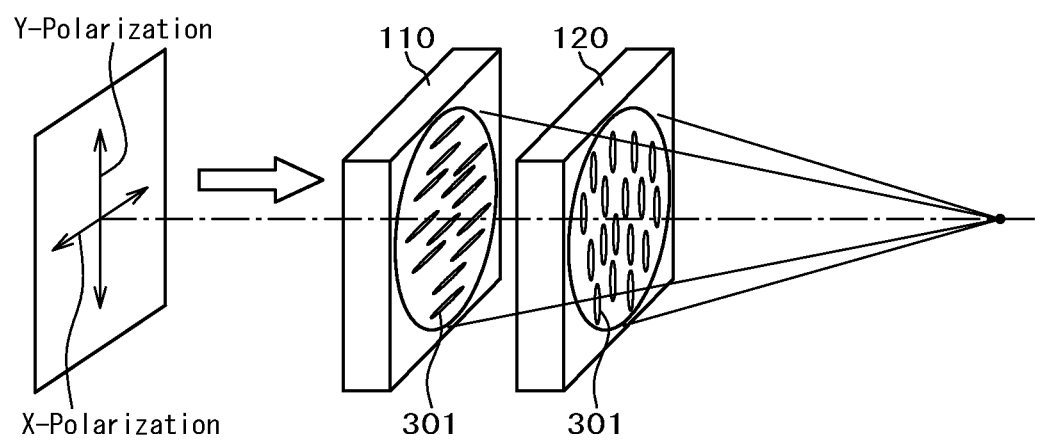
FIG. 14 is another cross-sectional view explaining a motion of a liquid crystal lens.

Since the liquid crystal has anisotropy in the refraction index, in order to form a lens, the second lens acting on the light deflected to the right angle direction to the deflection direction of the light to which the first lens acts is required. FIG. 14 is an exploded perspective view illustrating this lens configuration. In FIG. 14, the parallelogram on the left side expresses the wave front of the light. That is to say, the light deflected to X-direction and Y-direction enters the liquid crystal layer 300. A first liquid crystal lens 110 is a lens acting on X-polarized light, and a second liquid crystal lens 120 is a lens acting on Y-polarized light.

In FIG. 14, between the first liquid crystal lens 110 and the second liquid crystal lens 120, the initial orientation angle of the liquid crystal molecule 301 differs by 90 degrees. Initial orientation of the liquid crystal molecule 301 is determined by the orientation direction of the oriented film within the liquid crystal lens. That is to say, in FIG. 14, in the two first and second liquid crystal lenses 110 and 120, the orientation direction of the oriented film in the substrate on the side where the light enters is at right angle to each other.

Figure 15:
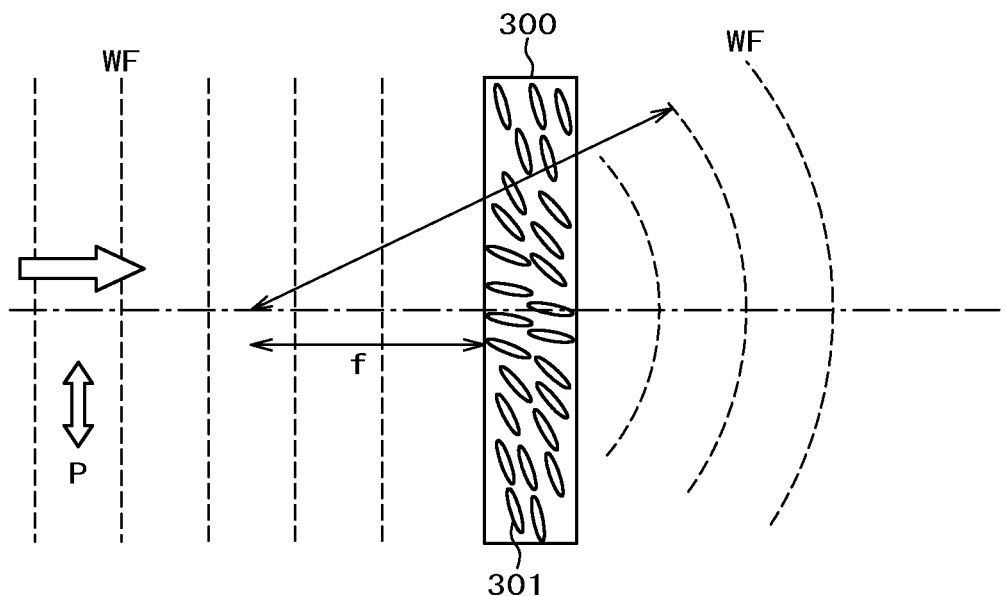
FIG. 15 is still other cross-sectional view explaining a motion of a liquid crystal lens.

FIG. 15 represents a case of forming a concave lens by the liquid crystal lens. In FIG. 15, light whose wave front WF is parallel to the liquid crystal layer 300 and is deflected to one direction enters the liquid crystal layer 300 from the left side. In FIG. 15, the liquid crystal molecule 301 in the liquid crystal layer 300 is oriented most in the vicinity of the optical axis by the electrode, and the orientation angle become smaller as it goes to the periphery. Because of the lens configuration by such liquid crystal orientation, the wave front WF of the light having passed through the liquid crystal layer 300 becomes a curve illustrated by the dotted line of FIG. 15, and a concave lens is formed. Further, in the case of the concave lens also, it is the same in terms that the two liquid crystal lenses are required as illustrated in FIG. 14.

Figure 16:
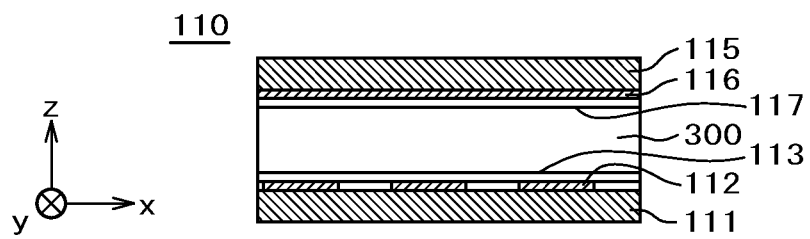
FIG. 16 is a cross-sectional view of the first liquid crystal lens.

FIG. 16 is a detailed cross-sectional view of the first liquid crystal lens 110. In FIG. 16, a first electrode 112 is formed on a TFT substrate 111, and a first oriented film 113 is formed to cover the first electrode 112. According to the orientation direction of the first oriented film 113, out of the incident light, polarized light of the direction along which the action is received by the liquid crystal lens is determined. Inside an opposition substrate 115, a second electrode 116 is formed, and a second oriented film 117 is formed to cover the second electrode 116. The relation of the orientation direction of the first oriented film 113 and the orientation direction of the second oriented film 117 is determined by which kind of the liquid crystal is to be used. Between the TFT substrate 111 and the opposition substrate 115, the liquid crystal layer 300 is sandwiched.

Figure 17:
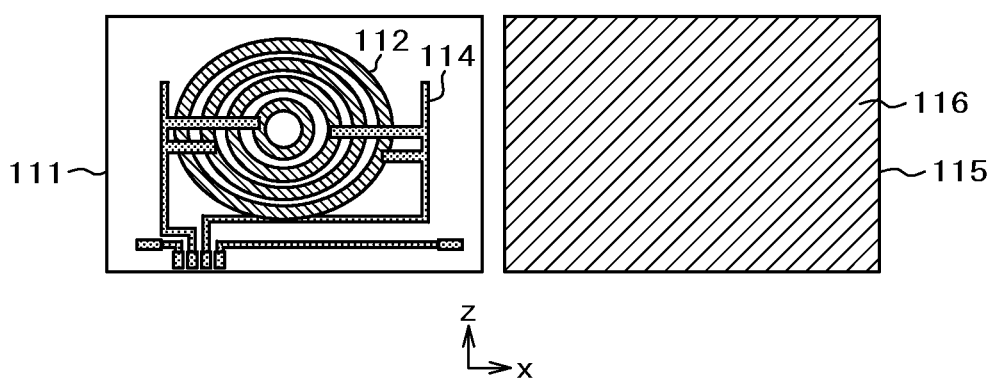
FIG. 17 is a plan view illustrating an electrode shape of the first liquid crystal lens.

The left side of FIG. 17 is a plan view of the first electrode 112 formed on the TFT substrate 111. The first electrode 112 is configured of plural concentric annular electrodes. To each of the annular electrodes of the first electrode 112, a lead cable 114 for applying voltage is connected. The drawing on the right side of FIG. 17 is a plan view illustrating the shape of the second electrode 116 formed on the opposition substrate 115. The second electrode 116 is a flat electrode, and is formed over almost all surface of the opposition substrate 115.

In FIG. 17, by changing the voltage between the first electrode 112 and the second electrode 116, lenses with various strengths can be formed. With respect to the example of FIG. 16 and FIG. 17, the first electrode 112 is formed concentrically, and therefore there is a feature that a circular lens can be formed easily.

The first liquid crystal lens 110 explained in FIG. 16 and FIG. 17 is a lens acting on one direction, for example, a polarized light PX. However, since the light from the LED 20 is polarized to all directions, at least a liquid crystal lens acting on light PY polarized to the right angle direction to PX is required.

Figure 18:
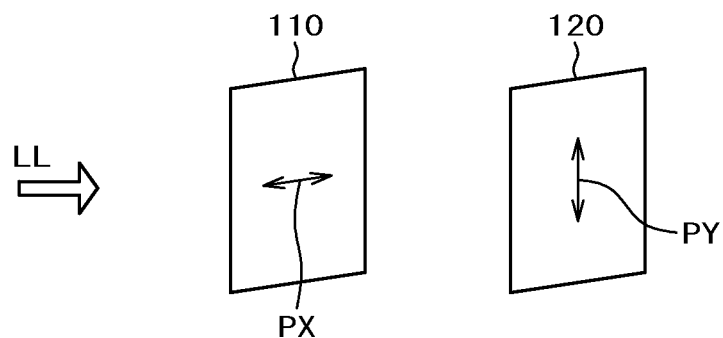
FIG. 18 is a perspective view illustrating a motion of the first liquid crystal lens and the second liquid crystal lens.

FIG. 18 is a perspective view illustrating this configuration. In FIG. 18, when the light LL from the LED 20 is incident from the left side, light polarized to PX-direction by the first liquid crystal lens 110 receives the action of the liquid crystal lens. Light polarized to PY-direction is not affected by the first liquid crystal lens 110. The light polarized to PY-direction receives the action of the liquid crystal lens by the second liquid crystal lens 120. The light polarized to PX-direction does not receive the action of the second liquid crystal lens 120. Thus both of the light polarized to x-direction and the light polarized to y-direction can receive the action of the liquid crystal lens.

Figure 19:
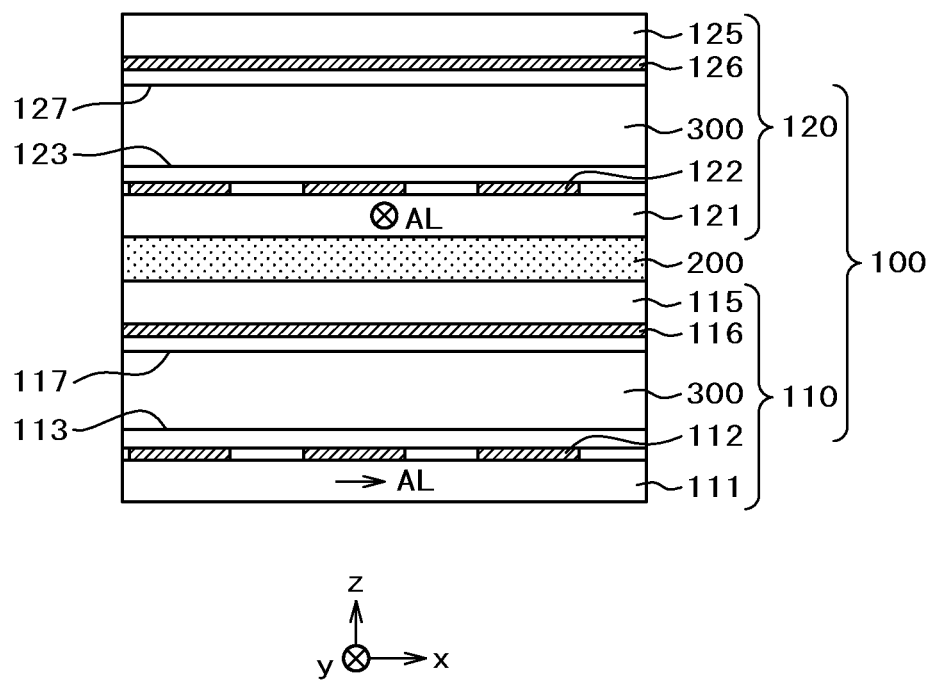
FIG. 19 is a cross-sectional view illustrating a state of laminating the first liquid crystal lens and the second liquid crystal lens.

FIG. 19 is a cross-sectional view illustrating a state of laminating the first liquid crystal lens 110 and the second liquid crystal lens 120. The first liquid crystal lens 110 and the second liquid crystal lens 120 adhere to each other by a transparent adhesive 200. In FIG. 19, the electrode configuration of the second liquid crystal lens 120 is the same as that of the first liquid crystal lens 110. That is to say, in the second liquid crystal lens 120, a third electrode 122 is formed on a TFT substrate 121, and a third oriented film 123 is formed on the third electrode 122. A fourth electrode 126 is formed on an opposition substrate 125, and a fourth oriented film 127 is formed on the fourth electrode 126.

The point that the second liquid crystal lens 120 differs from the first liquid crystal lens 110 is the orientation direction of the third oriented film 123. In FIG. 19, AL illustrates the orientation direction of the first oriented film 113. In FIG. 19, the orientation direction of the first oriented film 113 formed on the TFT substrate 111 in the first liquid crystal lens 110 is x-direction for example. The orientation direction of the third oriented film 123 formed on the TFT substrate 121 of the second liquid crystal lens 120 is y-direction for example. That is to say, both of the light polarized to x-direction and the light polarized to y-direction can receive the action by the two first and second liquid crystal lenses 110 and 120.

Also, the orientation direction of the second oriented film 117 formed on the opposition substrate 115 in the first liquid crystal lens 110 and the orientation direction of the fourth oriented film 127 formed on the opposition substrate 125 of the second liquid crystal lens 120 are determined by which kind of the liquid crystal is used as the liquid crystal layer 300. That is to say, the second oriented film 117 in the first liquid crystal lens 110 is oriented to the same direction as the first oriented film 113 in a case, and is oriented to the right angle direction of the first oriented film 113 in another case. The relation of the third oriented film 123 and the fourth oriented film 127 in the second liquid crystal lens 120 is also the same.

Figure 20:
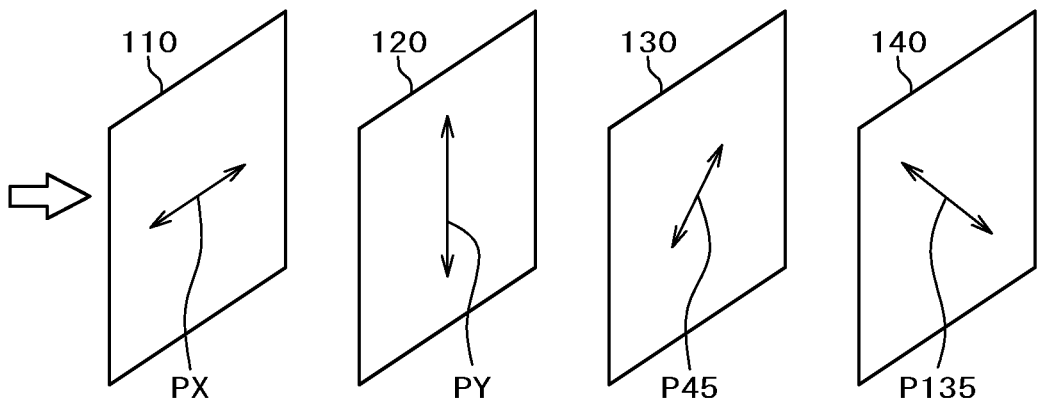
FIG. 20 is a perspective view illustrating a motion of the first liquid crystal lens, the second liquid crystal lens, the third liquid crystal lens, and the fourth liquid crystal lens.

In the meantime, the light from the LED 20 is polarized to all directions. Therefore, in acting only on the polarized light of PX or PY, there is a case that sufficient action of the liquid crystal lens cannot be obtained. In this case, as illustrated in FIG. 20, for example, a third liquid crystal lens 130 acting on light P45 polarized to 45 degrees direction with respect to x-direction and a fourth liquid crystal lens 140 acting on light P135 polarized to 135 degrees direction with respect to x-direction only have to be added.

Figure 21:
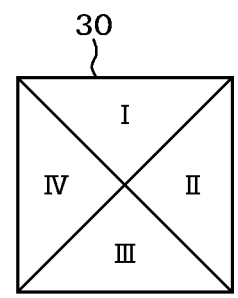
FIG. 21 is a plan view illustrating the relation of splitting of the quadrangular pyramid reflector and the liquid crystal lens.
Figure 21:
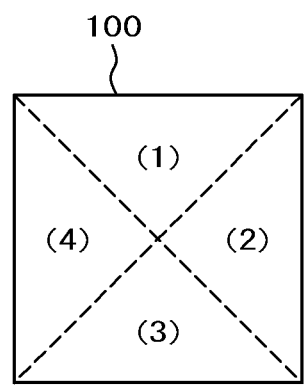

FIG. 21 is a plan view illustrating the relation of the quadrangular pyramid reflector and the liquid crystal lens 100. The drawing on the upper side of FIG. 21 is a plan view in viewing the quadrangular pyramid reflector 30 from the reflection surface side. The drawing on the lower side of FIG. 21 is a plan view of the liquid crystal lens 100. In FIG. 21, the region of the liquid crystal lens 100 is split into regions of (1), (2), (3), (4) matching the reflection surfaces I, II, III, IV of the quadrangular pyramid reflector. That is to say, by differentiating the lens action of the liquid crystal lens 100 for four reflection surfaces of the quadrangular pyramid reflector 30, the shape of the light spot from four reflection surfaces can be changed.

Figure 22:
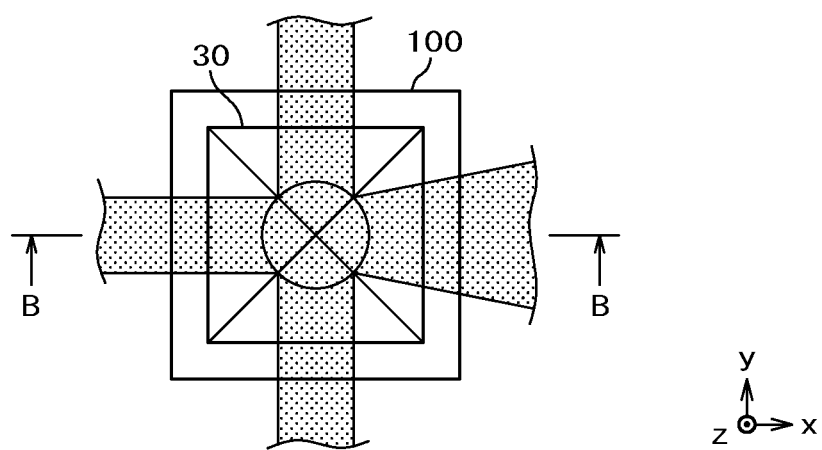
FIG. 22 is a plan view illustrating an action of the first embodiment.

FIG. 22 is a plan view of the lighting device according to the present invention enabling such configuration. In FIG. 22, the liquid crystal lens 100 is split into four regions as illustrated in FIG. 21 matching the reflection surfaces of the quadrangular pyramid reflector 30. FIG. 22 is a plan view of a case where a diverging lens is formed only in the region (2) in FIG. 21, and the lens action is not formed in other regions. In FIG. 22, the spot of the light emitted to the right side of x-direction becomes larger than the spot dimeter of the light emitted to other directions.

Figure 23:
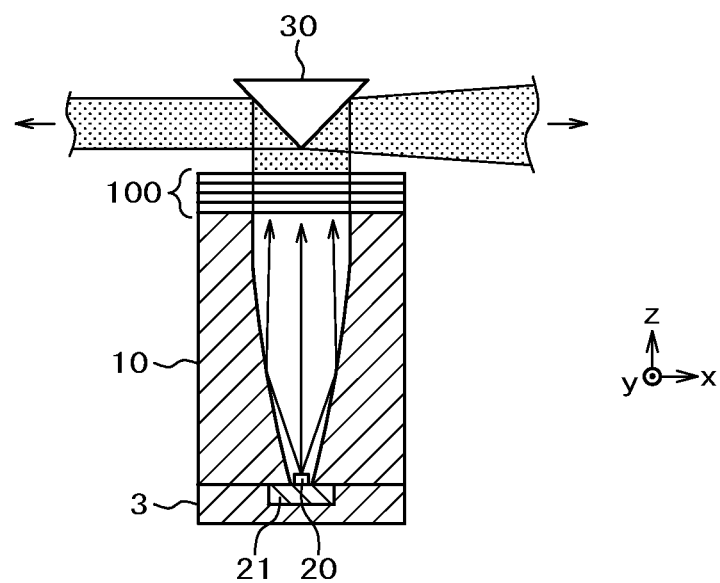
FIG. 23 is a cross-sectional view illustrating an action of the first embodiment.

FIG. 23 is a cross-sectional view taken along the line B-B of FIG. 22. In FIG. 23, the light reflected by the reflection surface on the left side of the quadrangular pyramid reflector 30 is emitted as the collimated light. The light reflected by the reflection surface on the right side of the quadrangular pyramid reflector 30 is emitted to the right side of x-direction while receiving the action of the liquid crystal lens 100 to diverge. That is to say, in FIG. 23, in the left and right of the lighting device, the light spot with different diameter can be obtained.

Figure 24:
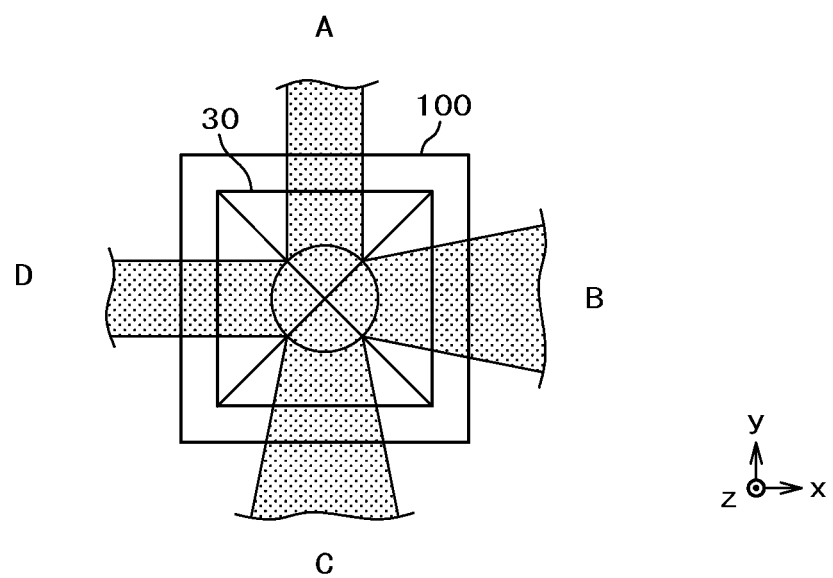
FIG. 24 is a plan view illustrating another action of the first embodiment.

When different lens action is formed for all of four regions (1), (2), (3), (4) of the liquid crystal lens 100 illustrated in FIG. 21, different light spot can be obtained for all of the four directions. FIG. 24 is a plan view illustrating it. In FIG. 24, on x-y plane, B-direction and C-direction receive a diffusing action by the liquid crystal lens 100. In FIG. 24, although the shape of z-direction is not described because FIG. 24 shows x-y plane, as explained in FIG. 23 and the like, the spot diameter can be changed also in z-direction.

Figure 25:
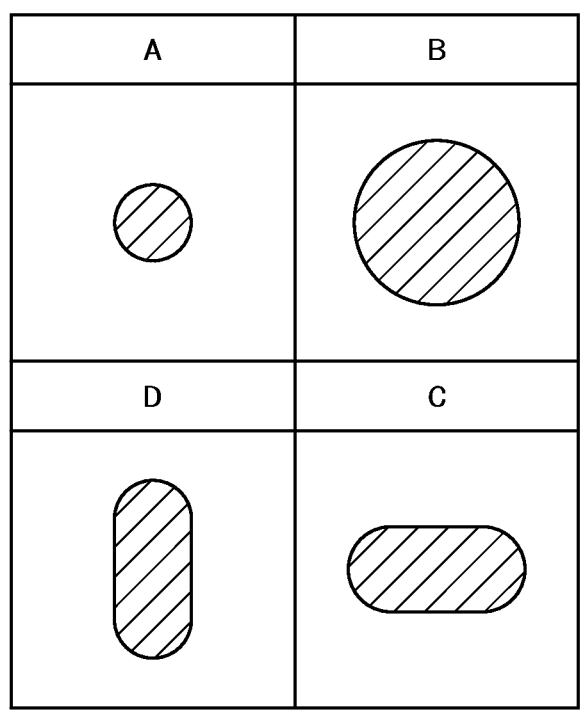
FIG. 25 is a cross-sectional view illustrating another action of the first embodiment.

FIG. 25 is an example of illustrating the shape of the light spot in the directions illustrated by A, B, C, D of FIG. 24. A illustrates the collimated light not receiving the action of the liquid crystal lens 100. B illustrates a case of receiving a diffusing action by the liquid crystal lens 100. C illustrates a case of receiving a diffusing action only in the lateral direction (y-direction of FIG. 24) by the liquid crystal lens 100. D illustrates a case of receiving a diffusing action only in the vertical direction (z-direction of FIG. 24) by the liquid crystal lens 100.

Figure 27:
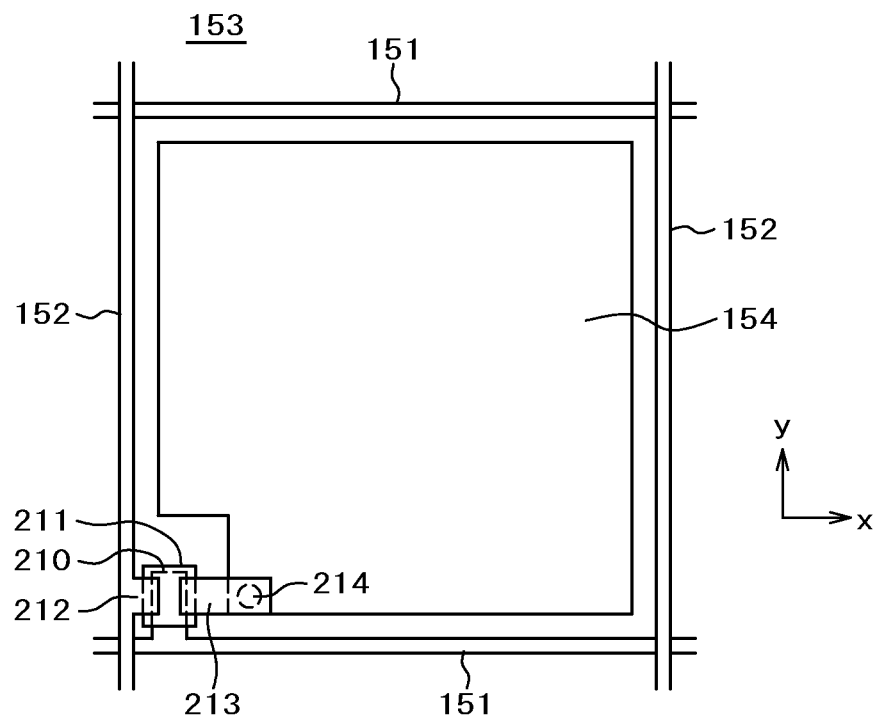
FIG. 27 is a plan view of a lens element of the liquid crystal lens.
Figure 28:
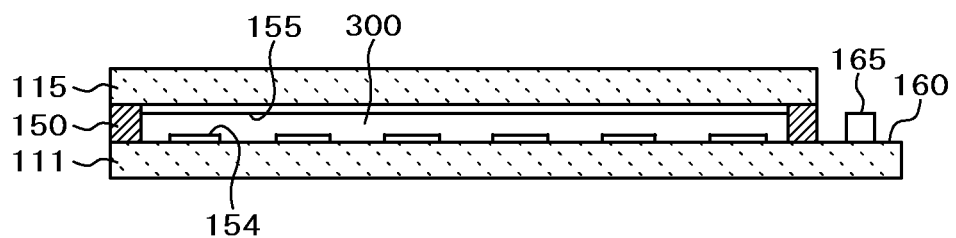
FIG. 28 is a cross-sectional view of the liquid crystal lens.

Although the shape of the light spot of each direction can be changed thus by changing the lens action of the regions (1), (2), (3), (4) of FIG. 21, such liquid crystal lens cannot be configured by the liquid crystal lens as illustrated in FIG. 16. Such liquid crystal lens can be achieved by arranging lens elements 153 in a matrix as illustrated in FIG. 26 to FIG. 28.

That is to say, in a case of the matrix arrangement, by controlling the voltage (signal line voltage and scanning line voltage in concrete terms) applied to a lot of lens elements arranged in the matrix, liquid crystal lenses having an optional action can be configured. In FIG. 26, although the diagonal line of the dotted line is the imaginal line, the regions (1), (2), (3), (4) illustrated in FIG. 21 are separated by it.

Figure 26:
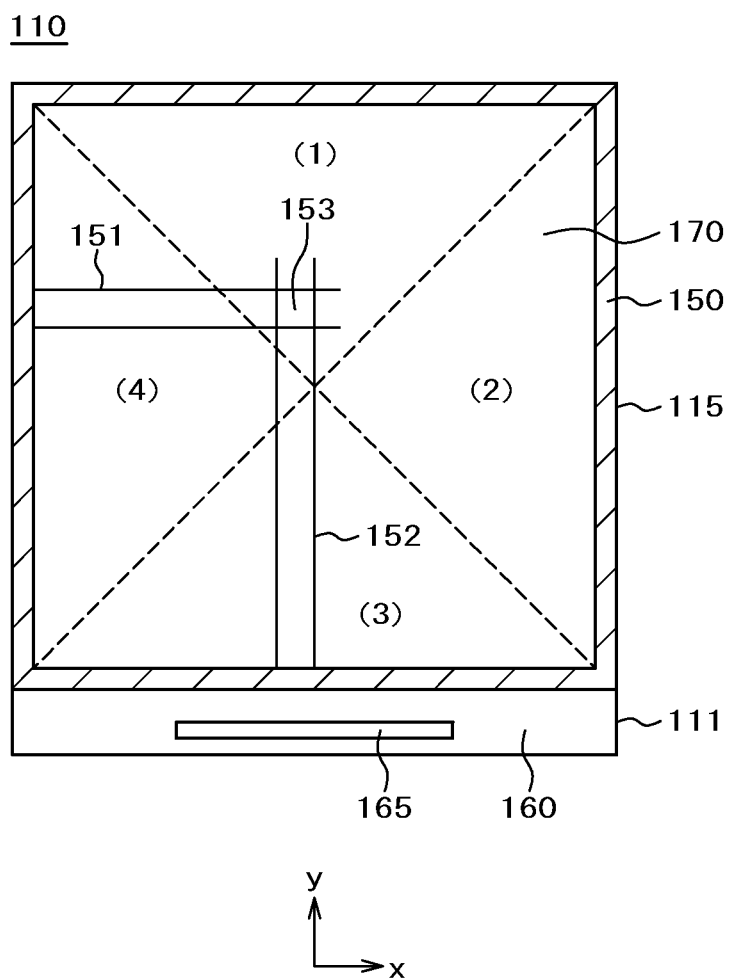
FIG. 26 is a plan view of a liquid crystal lens.

In FIG. 26, the TFT substrate 111 and the opposition substrate 115 adhere to each other in the periphery by a sealing compound 150, and the liquid crystal is sealed in the inside. A region where the TFT substrate 111 and the opposition substrate 115 overlap becomes a lens region 170. The TFT substrate 111 is formed larger than the opposition substrate 115, and a portion not overlapping with the opposition substrate 115 in the TFT substrate 111 is a terminal region 160. In the terminal region 160, a driver IC 165 and the like that drive the first liquid crystal lens 110 are disposed.

In the lens region 170 of FIG. 26, scanning lines 151 extend in the lateral direction (x-direction) and are arrayed in the vertical direction (y-direction). Also, signal lines 152 extend in the vertical direction and are arrayed in the lateral direction. The lens element 153 including a lens element electrode (which will be hereinafter simply referred to as an element electrode) is formed in a region surrounded by the scanning lines 151 and the signal lines 152. Voltage is applied between the element electrode and the common electrode formed in the opposition substrate, the liquid crystal molecule is oriented to the required direction, and the light is refracted.

FIG. 27 is a plan view of the lens element 153. In FIG. 27, in a region surrounded by the scanning lines 151 and the signal lines 152, an element electrode 154 is formed. Between the element electrode 154 and the signal line 152, a TFT (Thin Film Transistor) switched by a scanning signal is formed. The TFT is formed by a gate electrode 210 branched from the scanning line 151, a semiconductor film 211, a drain electrode 212 branched from the signal line 152, and a source electrode 213, and the source electrode 213 is connected to the element electrode 154 through a through hole 214. Other second liquid crystal lens 120, third liquid crystal lens 130, and fourth liquid crystal lens 140 also have a similar configuration.

FIG. 28 is a cross-sectional view of the liquid crystal lens. In FIG. 28, between the TFT substrate 111 where the element electrode 154 is formed and the opposition substrate 115 where a common electrode 155 is formed, the liquid crystal layer 300 is sandwiched. The TFT substrate 111 and the opposition substrate 115 adhere to each other by the sealing compound 150. Between the element electrode 154 and the common electrode 155, the lens element 153 is formed. The TFT substrate 111 is formed larger than the opposition substrate 115, a portion where the TFT substrate 111 does not overlap with the opposition substrate 115 becomes the terminal region 160, and the driver IC 165 is disposed in the terminal region 160.

With respect to the liquid crystal lens illustrated in FIG. 26 to FIG. 28, since the lens elements 153 are disposed in a matrix, the incident light can be enlarged and downsized in optional directions.

Second Embodiment

Figure 29:
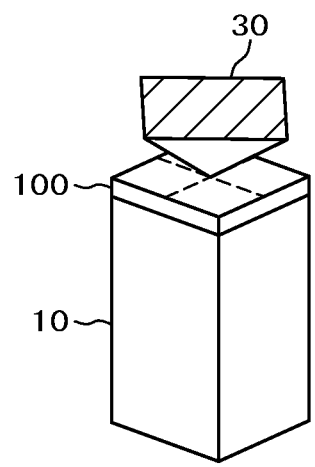
FIG. 29 is an example illustrating a combination of a quadrangular pyramid reflector and a liquid crystal lens.
Figure 30:
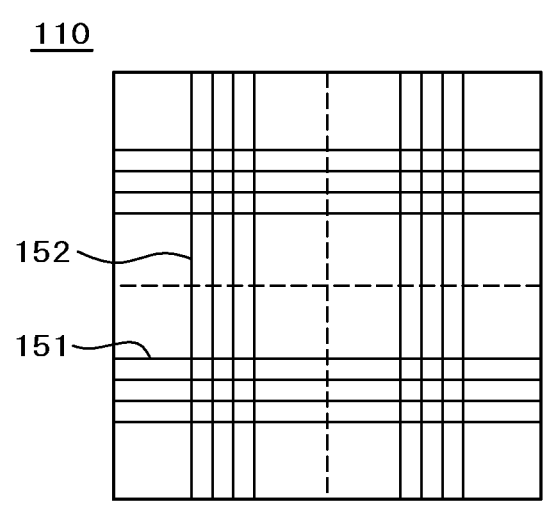
FIG. 30 is a plan view illustrating a splitting example of the liquid crystal lens corresponding to FIG. 29.

With respect to the splitting method of the liquid crystal lens 100 and the patterning method of the matrix, although various methods can be employed, there is also a case of being determined in relation with the layout of the quadrangular pyramid reflector 30. One of them is a layout illustrated in FIG. 29 and FIG. 30. As illustrated in FIG. 30, in this layout, the liquid crystal lens 100 is split into four rectangular regions, and the quadrangular pyramid reflector 30 is laid out to match them. Although this layout has an advantage that splitting of the liquid crystal lens 100 can be easily recognized, there is a problem that the quadrangular pyramid reflector 30 is not aligned with the liquid crystal lens 100 and the funnel type reflector 10. That is to say, there is a problem that it is hard to be assembled into a product compactly.

Figure 31:
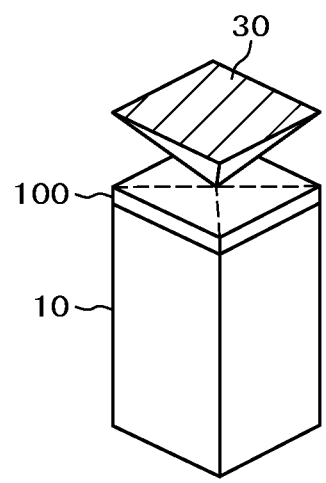
FIG. 31 is another example illustrating a combination of a quadrangular pyramid reflector and a liquid crystal lens.
Figure 32:
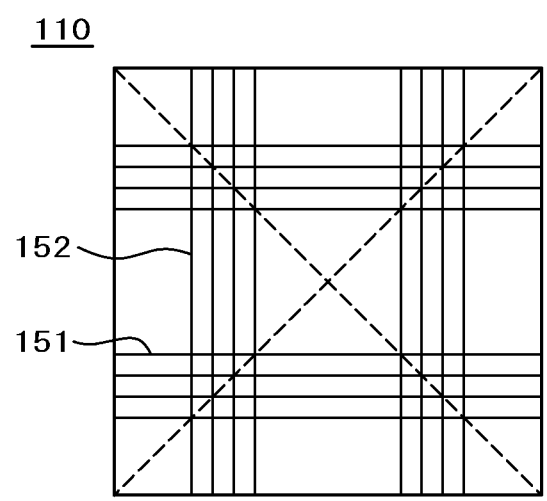
FIG. 32 is a plan view illustrating a splitting example of the liquid crystal lens corresponding to FIG. 31.

On the other hand, in FIG. 31 and FIG. 32, the liquid crystal lens 100 is split in the diagonal direction and is configured to form four triangular regions, and it is configured to dispose the quadrangular pyramid reflector 30 to match the triangular regions. This configuration can align the quadrangular pyramid reflector 30 with the liquid crystal lens 100 and the funnel type reflector 10. That is to say, there is an advantage that the sides of the liquid crystal lens 100 and the sides of the quadrangular pyramid reflector 30 can be made parallel to each other.

Even when the liquid crystal lens 100 is split into four triangles, it is not required to change the layout of the scanning line and the signal line. The application method of the scanning voltage and the signal voltage only has to be changed. Therefore, in considering assembling into a product, the combination of FIG. 31 and FIG. 32 is considered to be more rational.

Figure 33:
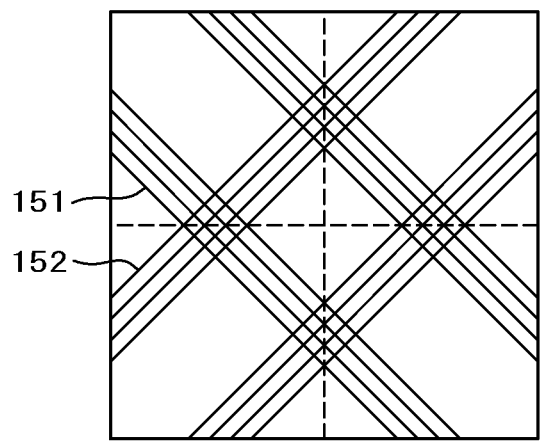
FIG. 33 is a plan view illustrating another wiring pattern and splitting example of the liquid crystal lens.
Figure 34:
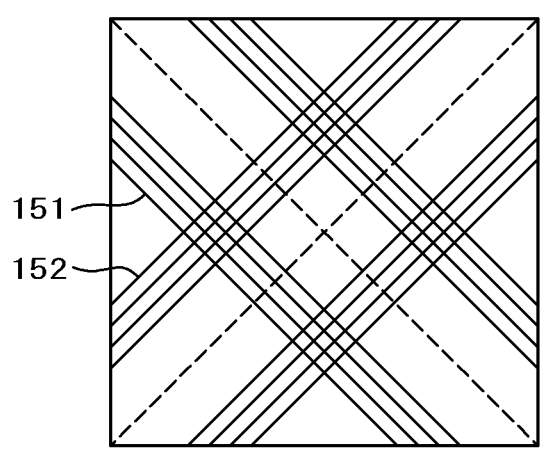
FIG. 34 is a plan view illustrating a still other wiring pattern and splitting example of the liquid crystal lens.

FIG. 33 and FIG. 34 are plan views illustrating other cabling patterns and splitting methods of the liquid crystal lens 100. In FIG. 33 and FIG. 34, the scanning line 151 is formed in parallel with a diagonal line, and the signal line 152 is formed in parallel with a diagonal line of the direction that insects the scanning line 151. Depending upon the shape of the lens formed by the liquid crystal lens 100, there is a case that a configuration of such cabling is suitable. FIG. 33 represents a case of splitting the liquid crystal lens 100 into four rectangular regions, and FIG. 34 represents a case of splitting the liquid crystal lens 100 into four triangular regions by the diagonal lines. The combination of the liquid crystal lens 100 and the quadrangular pyramid reflector 30 of the case of FIG. 33 is as per FIG. 29, and the combination of the liquid crystal lens 100 and the quadrangular pyramid reflector 30 of the case of FIG. 34 is as per FIG. 31.

According to the explanation described above, it is configured to diffract and split light using a quadrangular pyramid reflector. However, the present invention is not limited to it, and is also applicable to a case of using a triangular pyramid reflector or a pentagonal or more polygonal pyramid reflector. With respect to the splitting method of the liquid crystal lens, the patterning method, the arrangement method of the liquid crystal lens and the polygonal pyramid reflector including the triangular pyramid reflector, and so on of this case, the case of the quadrangular pyramid reflector 30 explained in the first embodiment and the second embodiment can be applied.

What is claimed is:
1. A lighting device, comprising:
a first reflector that includes: a first hole where a light source is disposed; a second hole that emits light; and a reflection curved surface that connects the first hole and the second hole to each other, in which a line connecting the center of the first hole and the center of the second hole is made to be a first direction, and the first reflector emits light to the first direction;
a liquid crystal lens disposed to cover the second hole of the first reflector; and
a polygonal pyramid including a bottom surface and three or more plurality of inclined surfaces, and being disposed so that the plurality of inclined surfaces oppose the liquid crystal lens, wherein
the plurality of inclined surfaces are reflection surfaces, and on the reflection surfaces, a traveling path of the light traveling to the first direction changes to a second direction, the second direction intersecting the first direction, and
the liquid crystal lens can configure lenses corresponding to the plurality of inclined surfaces.
2. The lighting device according to claim 1, wherein the polygonal pyramid is a quadrangular pyramid.
3. The lighting device according to claim 1, wherein in the liquid crystal lens, a plurality of lens elements capable of polarizing a liquid crystal molecule are formed in a matrix.
4. The lighting device according to claim 1, wherein in the liquid crystal lens, a scanning line extends in a first direction, a signal line extends in a second direction intersecting the scanning line, and a lens element is formed in a region surrounded by the scanning line and the signal line.
5. The lighting device according to claim 1, wherein the liquid crystal lens is configured such that four liquid crystal lens panels overlap.
6. The lighting device according to claim 1, wherein an angle formed by the first direction and the second direction is 90 degrees.
7. The lighting device according to claim 2, wherein the liquid crystal lens is of a rectangular shape, and can be split into four regions by diagonal lines, the region being of a triangular shape.
8. The lighting device according to claim 2, wherein in a plan view, the quadrangular pyramid is of a rectangular shape having a first side, the liquid crystal lens is of a rectangular shape having a second side, and the first side of the quadrangular pyramid is in parallel with the second side of the liquid crystal lens.

* * * * *